United States Patent
Lin et al.

(10) Patent No.: US 11,716,176 B2
(45) Date of Patent: Aug. 1, 2023

(54) METHOD AND SYSTEM FOR BROADCASTING DATA IN WIRELESS NETWORK

(71) Applicant: Carrier Corporation, Palm Beach Gardens, FL (US)

(72) Inventors: Chih-Kuang Lin, Dublin (IE); Davide Villa, Cork (IE); Adam Kuenzi, Silverton, OR (US); Michael Lang, Oregon City, OR (US); Ankit Tiwari, Natick, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/906,786

(22) Filed: Jun. 19, 2020

(65) Prior Publication Data

US 2020/0403736 A1 Dec. 24, 2020

(30) Foreign Application Priority Data

Jun. 21, 2019 (EP) .................................... 19181647
Jun. 21, 2019 (EP) .................................... 19181733

(51) Int. Cl.
*H04L 1/18* (2006.01)
*H04L 1/1829* (2023.01)
(Continued)

(52) U.S. Cl.
CPC ............. *H04L 1/1854* (2013.01); *H04W 4/23* (2018.02); *H04W 4/80* (2018.02); *H04W 28/04* (2013.01);
(Continued)

(58) Field of Classification Search
CPC ................. H04L 1/1854; H04L 1/1851; H04L 2001/0093; H04W 4/23; H04W 4/80;
(Continued)

(56) References Cited

U.S. PATENT DOCUMENTS

| 7,436,790 B2 | 10/2008 | Todd et al. |
| 9,043,602 B1 | 5/2015 | Krieger et al. |

(Continued)

FOREIGN PATENT DOCUMENTS

| CN | 105430605 A | 3/2016 |
| KR | 101917055 31 | 11/2018 |

(Continued)

OTHER PUBLICATIONS

European Search Report for application EP 19181647.9, dated Dec. 12, 2019, 10 pages.

(Continued)

*Primary Examiner* — Peter P Chau
(74) *Attorney, Agent, or Firm* — Cantor Colburn LLP

(57) ABSTRACT

A method for communicating data between Bluetooth Low Energy (BLE) devices (200, 202) in a network (100) comprising multiple nodes, the method comprising: broadcasting data from a broadcasting node (200); receiving the data at multiple receiving nodes (202); transmitting an acknowledgement (ACK) packet from each of the receiving nodes (202) to the broadcasting node (200), wherein each receiving node (202) waits for a waiting period before transmitting the ACK packet, and wherein the waiting period is a varying length of time for each receiving node (202).

20 Claims, 3 Drawing Sheets

Figure 1:
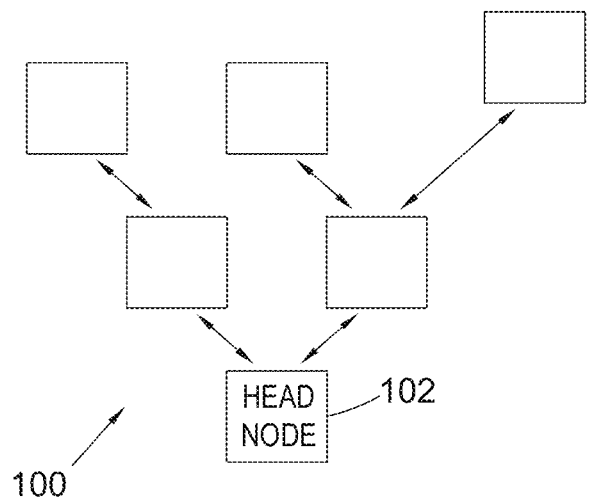

(51) Int. Cl.
*H04W 76/14* (2018.01)
*H04W 76/40* (2018.01)
*H04W 28/04* (2009.01)
*H04W 4/23* (2018.01)
*H04W 4/80* (2018.01)
*H04W 74/08* (2009.01)
*H04J 13/00* (2011.01)
*H04W 8/26* (2009.01)
*H04W 64/00* (2009.01)
*H04B 17/318* (2015.01)
*H04W 84/20* (2009.01)
*H04W 84/18* (2009.01)

(52) U.S. Cl.
CPC ....... *H04W 74/0808* (2013.01); *H04W 76/14* (2018.02); *H04W 76/40* (2018.02); *H04B 17/318* (2015.01); *H04J 13/0044* (2013.01); *H04W 8/26* (2013.01); *H04W 64/00* (2013.01); *H04W 84/18* (2013.01); *H04W 84/20* (2013.01)

(58) Field of Classification Search
CPC . H04W 74/0808; H04W 76/14; H04W 76/40; H04W 28/04; H04W 84/18; H04W 8/26; H04W 64/00; H04W 84/20; H04W 4/06; H04J 13/0044; H04J 13/004; H04B 17/318
See application file for complete search history.

(56) References Cited

U.S. PATENT DOCUMENTS

| | | |
|---|---|---|
| 9,179,412 B2 | 11/2015 | Kang et al. |
| 9,191,772 B2 | 11/2015 | Xue |
| 9,232,384 B2 | 1/2016 | Chen et al. |
| 9,258,695 B2 | 2/2016 | Kasslin et al. |
| 9,380,119 B2 | 6/2016 | Kasslin et al. |
| 9,398,437 B2 | 7/2016 | Kasslin et al. |
| 9,408,060 B2 | 8/2016 | Helms et al. |
| 9,420,407 B2 | 8/2016 | Jakusovszky et al. |
| 9,445,222 B2 | 9/2016 | Salokannel et al. |
| 9,451,436 B2 | 9/2016 | REUNAMAKi et al. |
| 9,479,892 B2 | 10/2016 | Knaappila et al. |
| 9,544,075 B2 | 1/2017 | Altman et al. |
| 9,544,713 B2 | 1/2017 | Chen et al. |
| 9,591,616 B2 | 3/2017 | Pang |
| 9,591,693 B2 | 3/2017 | Stroud |
| 9,681,381 B2 | 6/2017 | Kang |
| 9,734,480 B2 | 8/2017 | Kerai |
| 9,788,257 B2 | 10/2017 | Singh et al. |
| 9,794,934 B2 | 10/2017 | Zhang et al. |
| 9,801,059 B2 | 10/2017 | Ziv |
| 9,866,389 B2 | 1/2018 | Reed et al. |
| 9,924,342 B2 | 3/2018 | Logue et al. |
| 9,929,925 B2 | 3/2018 | Choi et al. |
| 9,949,204 B2 | 4/2018 | Palin et al. |
| 9,980,207 B2 | 5/2018 | Di Marco et al. |
| 10,013,826 B2 | 7/2018 | Ouellette |
| 10,039,057 B1 | 7/2018 | Lam et al. |
| 2003/0227934 A1 | 12/2003 | White et al. |
| 2005/0058151 A1 | 3/2005 | Yeh |
| 2007/0071025 A1* | 3/2007 | Bergstrom ............ H04L 1/1887 370/448 |
| 2012/0083210 A1 | 4/2012 | Cutrignelli |
| 2012/0281570 A1* | 11/2012 | Jung ..................... H04L 1/1854 370/252 |
| 2013/0182798 A1 | 7/2013 | Lozano |
| 2013/0336111 A1* | 12/2013 | Vos ......................... H04L 41/08 370/230 |
| 2014/0105009 A1* | 4/2014 | Vos ..................... H04L 47/2475 370/230 |
| 2014/0355582 A1 | 12/2014 | Kamath et al. |
| 2015/0172391 A1 | 6/2015 | Kasslin et al. |
| 2016/0353253 A1* | 12/2016 | Cherian ............ H04W 52/0216 |
| 2017/0034647 A1 | 2/2017 | Takeuchi et al. |
| 2017/0034856 A1 | 2/2017 | Takeuchi et al. |
| 2017/0041868 A1 | 2/2017 | Palin et al. |
| 2017/0303070 A1 | 10/2017 | Batra et al. |
| 2017/0317906 A1 | 11/2017 | Tsai et al. |
| 2017/0353365 A1 | 12/2017 | Li et al. |
| 2018/0041861 A1 | 2/2018 | Zhang et al. |
| 2018/0132183 A1 | 5/2018 | Gattu |
| 2020/0053831 A1* | 2/2020 | Park ........................ H04W 8/26 |
| 2020/0403736 A1 | 12/2020 | Lin et al. |
| 2020/0404473 A1 | 12/2020 | Lin et al. |

FOREIGN PATENT DOCUMENTS

| | | |
|---|---|---|
| WO | 2017160223 A1 | 9/2017 |
| WO | 2018088952 A1 | 5/2018 |

OTHER PUBLICATIONS

European Search Report for application EP 19181733.7, dated Nov. 14, 2019, 14 pages.

Mikhaylov et al.; "Multihop Data Transfer Service for Bluetooth Low Energy"; 2013 13th International Conference on ITS Telecommunications (ITST); Nov. 2013 (Year: 2013).

Villa et al.; "On-demand updates after a node failure in a wireless network"; 2020 31st Irish Signals and Systems Conference (ISSC); Jun. 2020 (Year: 2020).

* cited by examiner

METHOD AND SYSTEM FOR BROADCASTING DATA IN WIRELESS NETWORK

FOREIGN PRIORITY

This application claims priority to European Patent Application No. 19181647.9, filed Jun. 21, 2019 and European Application No. 19181733.7, filed Jun. 21, 2019, and all the benefits accruing therefrom under 35 U.S.C. § 119, the contents of which in its entirety are herein incorporated by reference.

BACKGROUND

The present disclosure relates to Bluetooth networks, particularly to methods of communication between Bluetooth devices in a Bluetooth low energy network.

The Bluetooth® Low Energy (BLE) specification is a set of standards for wireless network technologies operating within the 2.4-2.4835 GHz Industrial, Scientific and Medical (ISM) band. BLE is designed to considerably reduce power consumption compared to legacy, or "Classic", Bluetooth® devices.

Applications for the BLE specification include healthcare, security, fitness, and home entertainment. Within these applications, devices may utilise Bluetooth mesh profiles to communicate with other BLE devices in a network. Each device in the network can transfer data between other devices in the network, creating a so-called "mesh".

A number of previous applications have attempted to address various issues such as increasing the speed at which a connection between BLE devices is established and for avoiding data packet collision.

According to the BLE specification, a BLE device operates across 40 channels in the 2.4 GHz band, each mapped onto a set of RF (radio frequency) channel index values 0, 1, . . . , 39. Channels 0 to 36 are used for the transmission of data while channels 37, 38, and 39 are for the transmission of advertising (ADV) events.

The term "node" as used herein may refer to any device that may have BLE capability. Such devices may include smartphones, smart plugs, light bulbs, laptops, home entertainment devices or any other device that can connect to a BLE network. A node may also be able to communicate in other wireless networks, such as Wi-Fi® networks or cellular networks. A node may also be able to communicate via the Internet through such networks.

In the status quo, when a node does not have any data to send, it operates in a mode termed the "default mode". The default mode includes periodical ADV events and a low power state between the ADV events. Otherwise, if the node does have data to send, the node periodically sends periodic ADV events and inserts a scan mode between the ADV events. The scan mode is the mode in which the node is able to receive advertising packets from other nodes. The period of time over which this occurs is known as a scan window.

The ADV event comprises transmitting an ADV packet on one of the ADV channels. A first node may advertise sequentially on some or all of the three ADV channels. Similarly, if the first node is in the scan mode, the scan may occur sequentially on some or all of the three ADV channels.

If a second node is in the scan mode and detects an ADV packet sent by the first node, the second node may communicate with the first node and a data session between the first and second nodes may be established. Once the data session has been established, data can then be transferred between the first and second nodes.

These rules enable a fast data session setup for data exchanges while minimizing a node's energy consumption.

A BLE network node may also transmit a broadcast ADV packet to all devices on the network. When doing so, the broadcasting node may require that all other nodes in the network return an acknowledgment (ACK) packet, e.g., the SCAN Request packet in active scan mode or the ACK packet in multicast data mode, to the device to ensure that the broadcast data is received by all nodes on the network. This may require the ACK packet to be communicated through one or more nodes on the network in order to reach the broadcasting node. This situation may trigger simultaneous responses from multiple nodes, which may then cause collisions of ACK packets at various points in the BLE network. Active scan and multicast data delivery of BLE are examples of communications that may lead to packet collisions. Packet collisions lead to failed communications and the hindrance of data transmission in networks.

SUMMARY

Viewed from a first aspect, the present invention provides a method for communicating data between Bluetooth Low Energy (BLE) devices in a network comprising multiple nodes, the method comprising: broadcasting data from a broadcasting node; receiving the data at multiple receiving nodes; transmitting an acknowledgement (ACK) packet from each of the receiving nodes to the broadcasting node, wherein each receiving node waits for a waiting period before transmitting the ACK packet, and wherein the waiting period is a varying length of time for each receiving node.

Viewed from a second aspect, the invention provides a Bluetooth Low Energy network comprising multiple nodes and being an apparatus for communicating data between Bluetooth Low Energy (BLE) devices, the network comprising: a first BLE device configured to broadcast data; and multiple BLE receiving devices configured to receive broadcasted data; wherein the multiple receiving devices are receiving nodes that are configured to transmit an acknowledgement (ACK) packet to the first device upon receipt of broadcasted data, wherein each receiving node is configured to wait for a waiting period before transmitting the ACK packet; and wherein the waiting period is a varying length of time for each receiving node. The waiting period may be related to the receiving node's distance to the node broadcasting data or the receiving node's priority.

Viewed from a third aspect the invention provides a computer programme product containing instructions that, when executed within a Bluetooth Low Energy network comprising multiple nodes, will configure the network to operate in accordance with the method of the first aspect.

The following describes optional features that may be combined with the method of the first aspect, the network of the second aspect or the computer programme product of the third aspect.

A node that receives broadcast data may send an ACK packet to the node broadcasting the data. The ACK function is to provide end-to-end communication assurance between broadcasting node and receiving nodes. The ACK packet format is compliance with BLE specifications in active scan mode or data mode. The reply node may include useful information, e.g., the node's neighbour density, remaining energy, link quality information, etc., in the ACK packet.

This helps the broadcasting node learn the global network conditions and improves the overall network performance.

An advantage of the present invention is, by introducing a time delay at the receiving node before sending the ACK packet the likelihood of packet collisions is reduced. Alternatively, the receiving node may use Code Division Multiple Access (CDMA) to send an ACK packet. Because the CDMA transmission is orthogonal in code domain, the likelihood of ACK packets collision could be alleviated. CDMA uses orthogonal spread codes to protect the ACK delivery and requires no transmission schedule for the ACK delivery. With the CDMA option, the radio configuration and wireless signal needs to be changed.

The broadcasting node may be configured to broadcast or multicast to multiple receiving nodes in a BLE network. When a broadcast packet is sent by a BLE device, the broadcasting device may require the receiving devices to transmit an acknowledgment (ACK) packet to the broadcasting device so that the broadcasting device may verify receipt of its transmission at each receiving device. Alternatively, the broadcast packet may be a command for a receiving device to return information to the broadcasting device such as battery status or temperature.

An advantage of using the present method when a broadcasting node is broadcasting data to multiple receiving nodes is that, when each of the receiving nodes transmits an ACK packet the likelihood of packet collision between ACK packets is reduced.

The waiting period before transmission of an ACK packet from one receiving node may be different from the waiting period that occurs at a different receiving node. The waiting period at one receiving node may the same as the waiting period determined for another receiving node, if the waiting period of the receiving nodes is such that the likelihood of packet collision is decreased, or at least has not been increased by having waiting periods that are equal lengths of time.

The waiting period at each node may be randomised. The randomised waiting period may be any length of time greater than A. The randomised waiting period may be any length of time less than B.

Alternatively, the waiting period, i.e. the varying length of time, may be determined by information at a receiving node. The information that may be used includes, but is not limited to unique node information. That is, each receiving node may have a fixed waiting period before transmitting an ACK node that is dependent on the unique node information. The unique node information may be the node ID and the node's MAC address. Non-unique node information, such as a combination of RF signatures at the receiving node, receiver signal strength, and signal phase, may also be used to provide unique node information with a high probability that the information of one node will not be replicated at another node. These features are made unique in practical terms due to the time-varying wireless communication and physical surroundings. The waiting period at each receiving node may be different to the waiting period at all other receiving nodes. The waiting period at one receiving node may the same as the waiting period determined for another receiving node, if the waiting period of the receiving nodes is such that the likelihood of packet collision is decreased, or at least has not been increased by having waiting periods that are equal lengths of time.

The node ID may be assigned by a network operator, the MAC address may be provided by a manufacturer. RF signatures may be created when the node receives a packet.

The waiting period may also be determined by a combination of randomisation with node information. This may further reduce the possibility of an identical waiting period because the unique node information avoids the chance of the same randomized value chosen by two or more replying nodes.

By either randomising the waiting period or by determining the waiting period according to unique or non-unique node information, or a combination of any of these, the likelihood of packet collision can be further reduced. Randomisation of ACK packet transmission at each receiving node means that the chance of multiple nodes transmitting their ACK packets at the same time in response to receipt of broadcasted data is reduced.

An advantage of using unique node information for determining waiting period over randomisation is that the likelihood of packet collision may be reduced even further. This is because the unique node information may be used to schedule specific times at which each receiving node transmits an ACK packet when receiving broadcasted data. The receiving nodes may be configured to have scheduled times for ACK packet transmission that are unique to each receiving node, meaning that ACK packets are not transmitted at the same time and so do not collide.

The waiting period may be determined upon receipt of broadcasting data. Alternatively, the waiting period may be predetermined before receipt of the broadcasted data.

Changes in the network topology, density, and scalability, affect the proposed methods in terms of the number of ACK packets following the broadcast data. The increase may be linearly proportional to the network scale.

A receiving node may have to transmit an ACK packet through one or more intermediary nodes before the ACK packet can reach the broadcasting node. The intermediary nodes may also be receiving nodes.

ACK packets from downstream receiving nodes may be aggregated at intermediary nodes before being transmitted upstream. That is, multiple ACK packets may be transmitted from receiving nodes having a hop distance greater than an intermediary node to the intermediary node. The intermediary node may then hold the ACK packets and send the packets as a bundle. If the intermediary node is also a receiving node, the intermediary node may hold its own ACK packet if there are downstream receiving nodes. This bundling method is important because each ACK packet transmission has to follow the Bluetooth data communication protocols, ADV and SCAN process and data delivery. If the ACK packets are sent as a bundle, all of the packets may be delivered in one cycle of ADV and SCAN process for data session setup. Otherwise, every ACK packet delivery may use one cycle of ADV and SCAN process for the data session setup. This results in a higher ACK packet delay and energy wastes.

A BLE device may be any device that has the ability to communicate with other devices using Bluetooth low energy transmissions. Such devices may include smartphones, smart plugs, light bulbs, laptops, and home entertainment devices. BLE devices may be members of a BLE network. The BLE network may comprise a head node or gateway, where the head node is able to perform protocol conversions communicate data from the BLE network to another network that the head node is connected to. Other networks may include cellular networks, the Internet, a local intranet, and cloud networks.

In the BLE network, the BLE devices that are members of the network may be called nodes. The network may comprise any number of nodes and may be distributed so that the head node is connected to at least one node. Each node in the network may be connected directly to the head node or is connected to the head node via at least one other node. In this way, the head node is able to communicate with all nodes in a BLE network, and vice versa.

All nodes in the network may be considered to be downstream with respect to the head node and, conversely, the head node may be considered upstream of other nodes in the network. The structure of the network may be that data can travel from the head node and through other intermediary nodes before reaching a destination node. In this way, intermediary nodes may be upstream of some nodes and may be downstream of other nodes. A node that is at the edge of a network may be called an end node. Data that is transmitted from the head node to an intermediary node or end node may be considered to be travelling downstream. Data that is transmitted from an end node or intermediary node in the direction of the head node may be considered to be travelling upstream.

The BLE network may be configured to allow BLE devices to join and leave networks on the fly. The skilled person would readily understand that BLE networks may be configured to be restructured to account for new devices joining the network or current devices leaving the network. The skilled person would also readily understand that a BLE network may be configured to restructure itself to account for changes in the physical location of BLE devices in the network and/or optimise the network for efficient data transfer between devices.

The distance any particular node is away from the head node may be defined by the number of nodes data must travel through to reach that particular node. For example, a node that directly communicates with the head node may be considered one "hop" away from the head node. Likewise, a first node that communicates with the head node via a second node may be considered to be two "hops" away from the head node. In this latter case, the second node may be considered to be downstream of the head node and also upstream of the first node. In this way, it is possible to define how many hops any particular node is away from the head node. The number of hops has no bearing on the physical distance between nodes.

The hop distance for a particular node may change due to a reconfiguration of the network. Such a reconfiguration may occur for any number of reasons including, but not limited to: optimisation of the network; in response to the number of nodes in the network changing; and the physical movement of nodes in the network.

The hop distance for a particular node may be stored in the memory of said node as identifying data for that node. Other identifying data may include a node ID (identification) number or a MAC (media access control) address for the node. The node may store identifying data for other nodes in the network, such as neighbouring nodes.

When a node in the BLE network does not have data to send, it may maintain contact with the network by being in a default mode. The default mode may comprise the periodic emission of advertisement (ADV) events and being in a low power state between the ADV events. Periodic ADV interval range may be between 20 ms and 10240 ms, according to Bluetooth specification 4.0. The shorter the ADV interval is, more frequent the node wakes up and transmits the ADV packets, though this may lead to higher energy consumption.

A scan mode comprises a period of time in which a BLE device may receive data from an advertising BLE device. The channel on which the BLE device is scanning may be any one of the three ADV channels discussed above. The scan mode may sequentially cycle through each of the ADV channels. The period of time that the BLE device is scanning for is known as the "scan window". The period of time between scanning events is known as the "scan interval". The scan window may last for any length of duration up to a maximum length of time equal to the scan interval. The scan interval may have a defined duration. The scan window may have a defined duration that is less than the scan interval. According to Bluetooth specification 4.0, the scan window and scan interval range is between 2.5 ms and 10240 ms. The scan window may have a defined duration within a time period. This time period determines the maximum time of scanning an ADV channel. The shorter this time period is, the faster the node scans all of ADV channels and leads to a quick target discovery. The scan window may have a defined duration that is less than or equal to the scan interval.

An advertisement (ADV) event comprises the transmission of an ADV signal by a first BLE device. The purpose of this signal may be to advertise that the first BLE device is available to establish a wireless connection. The ADV signal may be detected by a second BLE device that is in scan mode and a data session may then be established between the two devises and data may be exchanged between them.

As discussed above, a BLE device may advertise on up to three advertising channels. An ADV event may comprise a BLE device transmitting an ADV signal on one, two or all three of the three available channels.

DRAWING DESCRIPTION

Figure 2:
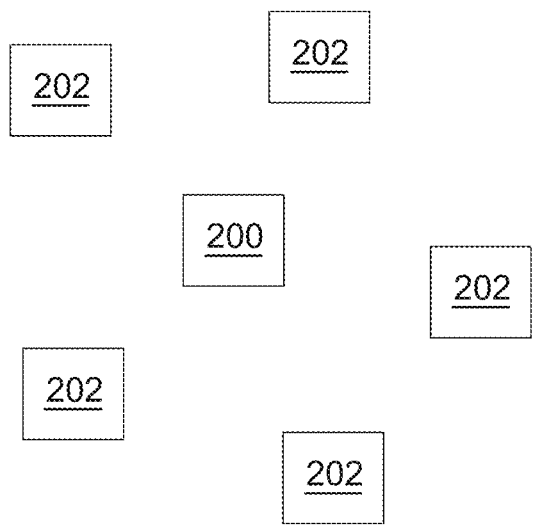
Figure 3:
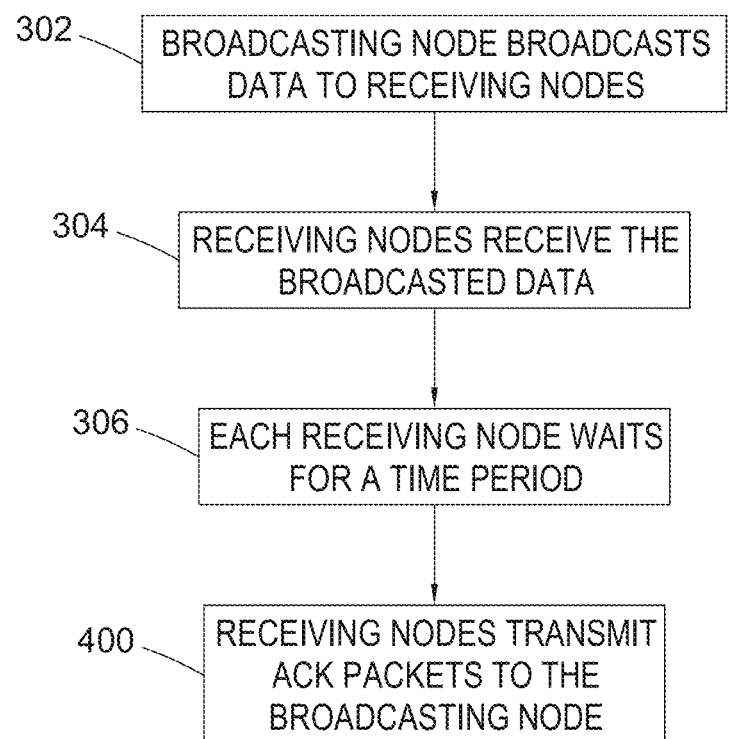
Figure 4:
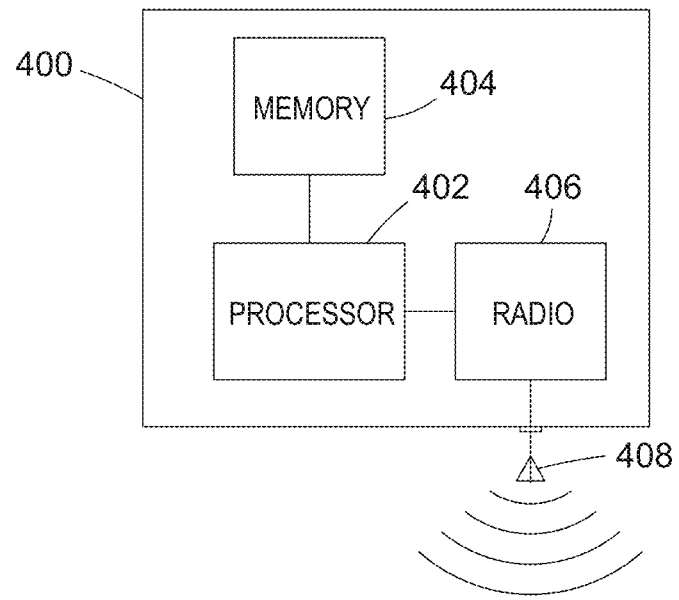
Figure 4:
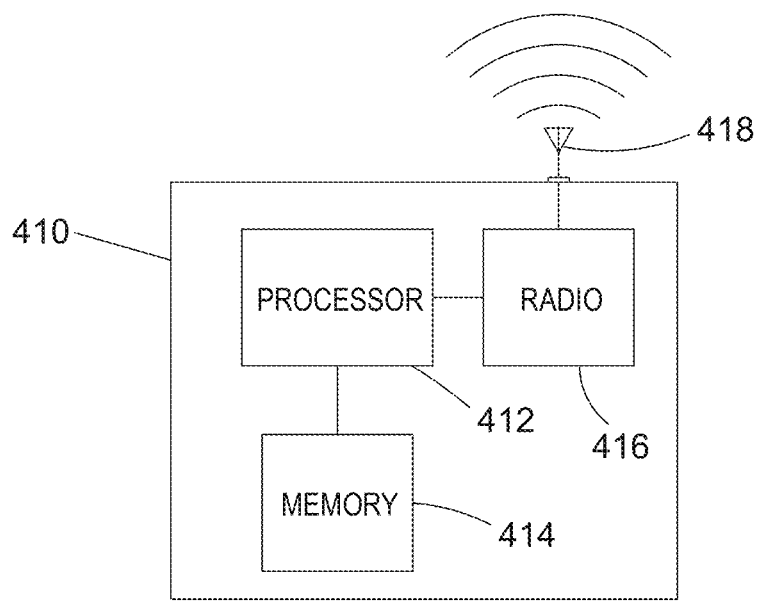

Certain embodiments of the invention will now be described by way of example only and with reference to the accompanying drawings in which:

FIG. 1 shows an exemplary BLE network.
FIG. 2 shows BLE devices as a broadcasting node and a plurality of receiving nodes.
FIG. 3 is a flowchart illustrating a method for broadcasting data from a broadcasting node to one or more of multiple receiving nodes.
FIG. 4 shows a schematic view of a pair of BLE devices.

DETAILED DESCRIPTION

A BLE mesh network may comprise a head node or gateway that transmits data to one or more nodes within the network. The network may comprise any number of nodes. All nodes in the network are considered to be downstream with respect to the head node and, conversely, the head node is upstream of other nodes in the network. The structure of the network may be that data can travel from the head node and through other intermediary nodes before reaching a destination node.

FIG. 1 shows an example BLE network 100 where the network 100 is depicted as a tree. A head node 102 forms the "root" of the network 100 and devices in the BLE network form "branches" in the network. Some BLE devices are not directly connected to the head node 102; instead they are connected via a branch node. This means that any transmissions sent from the head node 102 may have to be communicated through another BLE node before the transmission reaches its destination node.

A BLE device may be configured to broadcast data to a plurality of other BLE devices. The BLE device that broadcasts data may be termed a broadcaster or a broadcasting node. A BLE device that receives broadcasted data may be termed a receiver or a receiving node.

FIG. 2 shows a broadcasting node 200 and a plurality of receiving nodes 202. Each node may be able to determine its position in a BLE network relative to other nodes by storing identifying information about its neighbours. Neighbouring nodes may be defined as those that are immediately connected to a node in the network. Identifying information may include hop distance and a unique node ID.

The broadcasting node 200 is configured to broadcast data to one or more of the plurality of receiving nodes 202. The broadcast data formation should follow the BLE specifications in data transmission. Each receiving node 202 is configured to receive data broadcast from the broadcasting node 200 and to transmit an ACK packet back to the broadcasting node 200. The broadcasting node 200 is configured to receive ACK packets from all of the receiving nodes 202 to which the broadcast data was sent.

A receiving node 202 may not be directly connected to the broadcasting node 200 in the BLE network. Upon receipt of broadcasted data, the receiving node may transmit its ACK packet via one or more intermediary nodes back to the broadcasting node 200.

Receiving nodes 202 of the exemplary BLE network are configured to coordinate transmission of ACK packets to the broadcasting node 200. One or more receiving nodes 202 are configured to introduce a time delay before transmission of an ACK packet.

In one example, the time delay is a random time delay. In this case, receiving nodes 202 are configured to receive data broadcasted from a broadcasting node 200, wait for a random length of time, and transmit an ACK packet to the broadcasting node 200. The longer the random back-off period is, the less likely ACK packet collision will occur.

In another example, the time delay is determined using a property of the node, such as unique node information. The unique information used includes, but is not limited to, the node ID and the node's MAC address. In this case, receiving nodes 202 are configured to receive data broadcasted from a broadcasting node 200, wait for a length of time that is determined by information unique to each receiving node 202, and transmit an ACK packet to the broadcasting node 200.

FIG. 3 is a flowchart showing an exemplary method for broadcasting data from a broadcasting node to one or more of multiple receiving nodes. At step 302, a broadcasting node broadcasts data to multiple receiving nodes. At step 304, multiple receiving nodes receive the broadcasted data. At step 306, the receiving nodes wait for a waiting period, where the waiting period for each receiving node may be different. At step 308, the receiving nodes transmit an ACK packet to the broadcasting node.

At step 306, the length of the waiting period at each receiving node may be a random value or it may be a value that is dependent on information unique to each node.

FIG. 4 illustrates a pair of BLE devices 400, 410 which may utilise the methods discussed above. The BLE devices 400, 410 might be any suitable known type of device, and they are modified compared to the known devices to operate in accordance with a method as set out above. A first BLE device 400 comprises a processor 402, a memory unit 404, a radio 406, and an antenna 408. Computer program products for performing the methods described herein may be stored as an application in the memory unit 404. The memory unit 404 can be a hard drive, solid state or optical memory source. The processor 402 is configured to access and execute software, applications, and data stored on the memory unit 404.

The radio 406 is configured to receive and transmit BLE signals via the antenna. The processor 402 is configured to interface with the radio 406 and the application may be configured to control the radio 406 and antenna 408 when executed on the processor 402.

A second BLE device 410 includes similar hardware an operations to the first BLE device 400. The antenna 408 of the first BLE device 400 is configured to communicate with the antenna 418 of the second BLE device 410.

What is claimed is:

1. A method for communicating data between Bluetooth Low Energy (BLE) devices in a network comprising multiple nodes, the method comprising:
    broadcasting data from a broadcasting node;
    receiving the data at multiple receiving nodes;
    transmitting an acknowledgement (ACK) packet from each of the receiving nodes to the broadcasting node, wherein each receiving node waits for a waiting period before transmitting their ACK packet, and wherein the waiting period is a varying length of time for each receiving node,
    wherein the waiting period is determined by information that is unique to each respective receiving node, wherein the information unique to each respective receiving node is a node identification (ID) and/or a media access control (MAC) address, and wherein the waiting period for each respective receiving node is determined by a distance the respective receiving node is from the broadcasting node.

2. The method of claim 1, wherein the waiting period is different for each receiving node.

3. The method of claim 1, wherein the waiting period is determined by information that is non-unique to each respective receiving node, wherein the non-unique information comprises a combination of radio frequency (RF) signatures at the respective receiving node, receiver signal strength, and signal phase.

4. The method of claim 3, wherein the non-unique information is a combination of RF signatures generated at the respective receiving node.

5. The method of claim 3, wherein the non-unique information is a signal strength at the respective receiving node.

6. The method of claim 3, wherein the non-unique information is a signal phase at the respective receiving node.

7. The method of claim 1, wherein each respective receiving node sends an ACK packet using Code Division Multiple Access (CDMA).

8. A Bluetooth Low Energy network comprising multiple nodes, the network being an apparatus for communicating data between Bluetooth Low Energy (BLE) devices, the network further comprising:
    a first BLE device configured to broadcast data; and
    multiple BLE receiving devices configured to receive broadcasted data;
    wherein the multiple receiving devices are receiving nodes that are configured to transmit an acknowledgement (ACK) packet to the first BLE device upon receipt of broadcasted data, wherein each receiving node is configured to determine and wait for a waiting period before transmitting their ACK packet; and
    wherein the waiting period is a varying length of time for each receiving node,
    wherein the waiting period is determined by information that is unique to each respective receiving node, wherein the information unique to each respective receiving node is a node identification (ID) and/or a media access control (MAC) address, and wherein the waiting period for each respective receiving node is determined by a distance the respective receiving node is from the broadcasting node.

9. A Bluetooth Low Energy network comprising multiple nodes, the network being configured to operate in accordance with the method of claim 1.

10. A computer program product containing instructions stored on a non-transitory computer readable medium that, when executed within a Bluetooth Low Energy network comprising multiple nodes, will configure the network to operate in accordance with the method of claim 1.

11. A method for communicating data between Bluetooth Low Energy (BLE) devices in a network comprising multiple nodes, the method comprising:
  broadcasting data from a broadcasting node;
  receiving the data at multiple receiving nodes;
  transmitting an acknowledgement (ACK) packet from each of the receiving nodes to the broadcasting node, wherein each receiving node waits for a waiting period before transmitting their ACK packet, and wherein the waiting period is a varying length of time for each receiving node,
  wherein the waiting period is determined by information that is unique to each respective receiving node, wherein the information unique to each respective receiving node is a node identification (ID) and/or a media access control (MAC) address, and wherein the waiting period is determined by information that is non-unique to each respective receiving node, wherein the non-unique information comprises a combination of radio frequency (RF) signatures at the respective receiving node, receiver signal strength, and signal phase.

12. The method of claim 11, wherein the waiting period for each respective receiving node is determined by a distance the respective receiving node is from the broadcasting node.

13. The method of claim 11, wherein the waiting period is different for each respective receiving node.

14. The method of claim 11, wherein the non-unique information is a combination of RF signatures generated at the respective receiving node.

15. The method of claim 11, wherein the non-unique information is a signal strength at the respective receiving node.

16. The method of claim 11, wherein the non-unique information is a signal phase at the respective receiving node.

17. The method of claim 11, wherein each respective receiving node sends an ACK packet using Code Division Multiple Access (CDMA).

18. A Bluetooth Low Energy network comprising multiple nodes, the network being an apparatus for communicating data between Bluetooth Low Energy (BLE) devices, the network further comprising:
  a first BLE device configured to broadcast data; and
  multiple BLE receiving devices configured to receive broadcasted data;
  wherein the multiple receiving devices are receiving nodes that are configured to transmit an acknowledgement (ACK) packet to the first BLE device upon receipt of broadcasted data, wherein each receiving node is configured to wait for a waiting period before transmitting their ACK packet; and
  wherein the waiting period is a varying length of time for each respective receiving node,
  wherein, at each respective receiving node, the waiting period is determined by information that is unique to each respective receiving node, wherein the information unique to each respective receiving node is a node identification (ID) and/or a media access control (MAC) address, and wherein the waiting period is determined by information that is non-unique to each respective receiving node, wherein the non-unique information comprises a combination of radio frequency (RF) signatures at the respective receiving node, receiver signal strength, and signal phase.

19. A Bluetooth Low Energy network comprising multiple nodes, the network being configured to operate in accordance with the method of claim 11.

20. A non-transitory computer readable medium comprising a computer program product containing instructions that, when executed within a Bluetooth Low Energy network comprising multiple nodes, will configure the network to operate in accordance with the method of claim 11.

* * * * *